United States Patent [19]

Fischer

[11] Patent Number: 4,977,729
[45] Date of Patent: Dec. 18, 1990

[54] APPARATUS FOR THE AUTOMATIC PACKAGING OF A FRAGILE PRODUCT IN A FOLDING CARTON

[76] Inventor: Wilhelm Fischer, Weidacher Str. 1-3, D-8968, Durach, Fed. Rep. of Germany

[21] Appl. No.: 370,134

[22] Filed: Jun. 21, 1989

Related U.S. Application Data

[63] Continuation of Ser. No. 177,522, Feb. 9, 1988, abandoned.

[30] Foreign Application Priority Data

Oct. 31, 1986 [DE] Fed. Rep. of Germany ....... 3637112

[51] Int. Cl.$^5$ ............................................. B65B 43/10
[52] U.S. Cl. ........................................ 53/574; 53/207; 53/209; 198/377; 493/179
[58] Field of Search ................. 53/574, 207, 209, 456, 53/462, 563; 198/377; 493/178, 179

[56] References Cited

U.S. PATENT DOCUMENTS

| 2,953,879 | 9/1960 | Murray | 53/209 X |
| 3,189,158 | 6/1965 | Lucas | 198/377 |
| 3,385,234 | 5/1968 | Anderson | 53/456 X |
| 3,543,469 | 12/1970 | Ullman | 53/456 |
| 3,587,824 | 6/1971 | Rochla | 198/377 |
| 3,673,763 | 7/1972 | Dorfman | 53/209 |
| 3,927,505 | 12/1975 | Bemiss | 53/546 |
| 3,990,210 | 11/1976 | McDonough | 53/456 |

Primary Examiner—John Sipos
Attorney, Agent, or Firm—Cushman, Darby & Cushman

[57] ABSTRACT

The invention relates to a process and an apparatus for packaging a fragile product (8) in a folding carton (19), the problem being to carry out the forming of the folding carton blank (1), the filling of the carton (19) and the closing of the carton (19) automatically in a continuous movement without damaging the fragile product (8). To solve this problem, the invention proposes transporting the folding carton blank (1) in a constant direction, involving initial partial pre-forming of the blank (1), which is then filled with the product (8) and closed with overlapping (12) lid flaps (5), after which the filled blank (1,19) is turned through 90° around a vertical axis and is subsequently closed in a continuous forward movement.

3 Claims, 2 Drawing Sheets

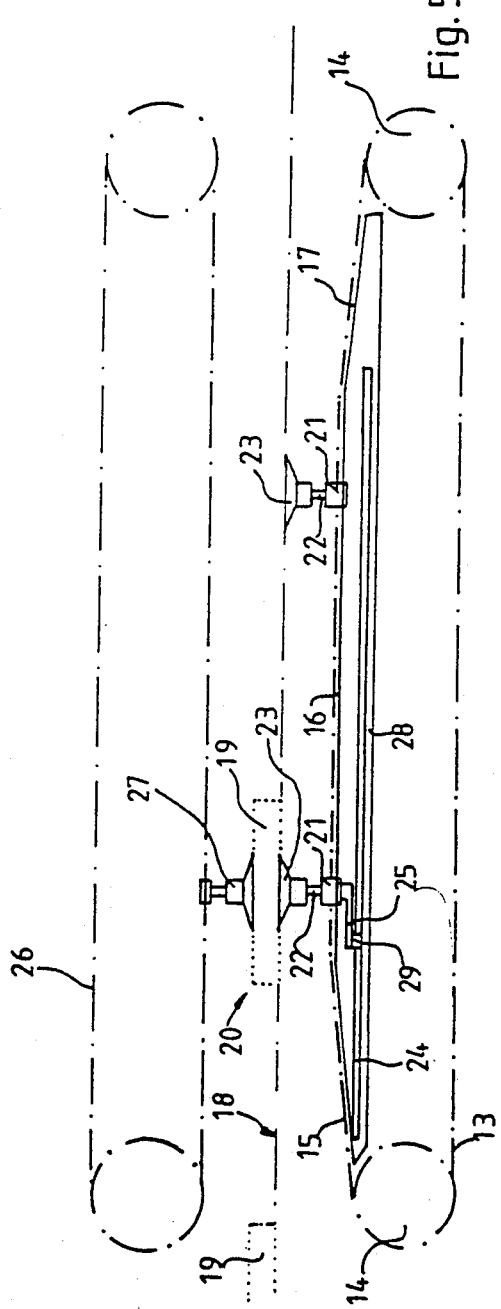
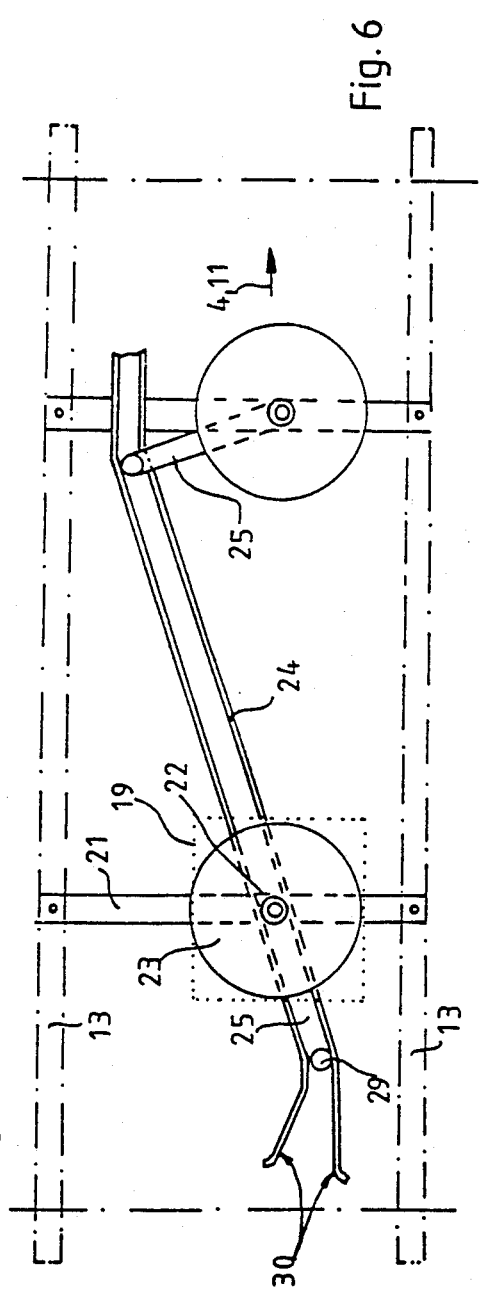

APPARATUS FOR THE AUTOMATIC PACKAGING OF A FRAGILE PRODUCT IN A FOLDING CARTON

This is a division of application Ser. No. 177,522, filed Feb. 9, 1988, which was abandoned upon the filing hereof.

BACKGROUND OF THE INVENTION

The invention relates to a process and an apparatus for the automatic packaging of a fragile product in a folding carton with a rectangular or square base.

The careful filling of a fragile product into the pre-formed base section of a carton that can be closed with a lid and the application of the lid to this base section have been disclosed in the past. These operations can only be automated by introducing a process that works in stages, where the facilities for feeding in the carton bases and lids take up a considerable amount of space. The output of such a packaging line is also very small.

SUMMARY OF THE INVENTION

The general aim of the present invention is to bring about a substantial output increase in the automatic packaging of fragile products, while the specific purpose of the invention is to fill a fragile product in a folding carton without interrupting the forward movement of the carton and to close the folding carton by gluing without putting the product under any mechanical strain.

"Fragile" products in this context are taken to mean all products that may not be subjected to the influence of pressure or similar stresses, such as bakery products, frozen food, objects made from glass, ceramics or other fragile materials. In relation to the bakery products, frozen food or similar products mentioned above, the word "fragile" is taken to mean that these products may not come into contact with the parts of the folding carton in such a way that the product or its quality may be impaired.

The process proposed by the invention to achieve the above purpose consists of the following stages: The individual folding carton blank is removed from a magazine and is formed initially by folding the side panels parallel to the transport direction upwards and the lid flaps adjacent to them parallel to the transport surface; the product is filled in the base section of the folding carton which has been formed in this way but which is still open at the front and the back; The lid flaps are folded into the closing position and their overlapping edges are glued together; The individual filled folding carton is turned through 90° around a vertical axis during a continuous advance operation; The end flaps of the folding carton that are now located at the sides are folded into the closing position and are glued together.

The process proposed by this invention makes it possible to carry out the forming, filling and closing of a folding carton in a continuous operation and to increase the output considerably at the same time. The closure and gluing of the lid flaps following the filling operation do not put the filled product under any strain. It is advisable to use an adhesive that sets particularly quickly. Hotmelt adhesives, which are applied in a hot and thus liquid state by jet-like applicators and set quickly by cooling, are particularly suitable for this purpose. Since the lid flaps still tend to move away from the direction of bending after the folding operation, the glued, overlapping edges of the lid flaps only need to be conveyed along a pressure bar which counters the resilience of the lid flaps.

If it proved necessary to use an adhesive that requires the application of more intensive pressure on the lid flaps, it is advisable to fold the lid flaps over a fixed metal plate secured at the end away from the transport direction in such a way that this metal plate takes up a position between the filled product and the lid flaps. If this is done, greater external force can be exerted on the overlapping edges of the lid flaps, because the metal plate absorbs the pressure and thus makes sure that the product is protected from the effects of this pressure.

It would not, however, be possible to glue the closure flaps on the ends in a continuous operation and without putting the product under strain unless other measures were taken. To avoid these problems, the filled folding carton—the lid flaps of which have already been closed—is turned through 90° around a vertical axis while it is still being moved forwards. The end flaps are now parallel to the transport direction and can be folded without putting any strain on the product, coated with adhesive and pressed together.

An advantageous apparatus for implementing the process proposed by this invention is outlined in claims 2 to 4.

BRIEF DESCRIPTION OF THE INVENTION

Details of the invention are illustrated in the examples given in diagrammatic form in the drawings.

DETAILED DESCRIPTION OF THE INVENTION

Figure 1:
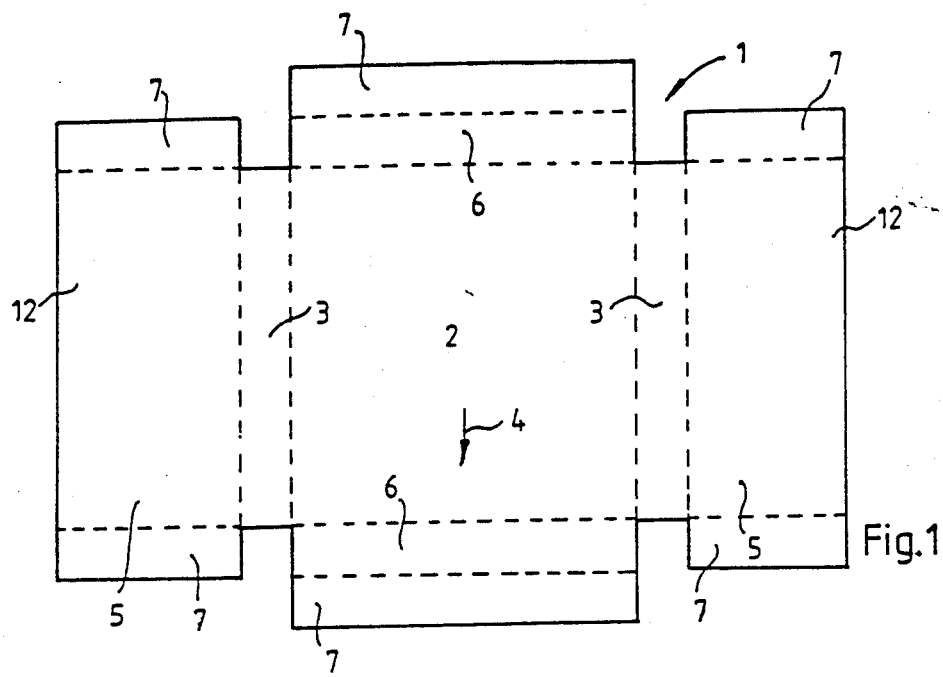
FIG. 1 is a top view of a blank for a folding carton.

The example shown in FIG. 1 is a top view of the blank 1 for a folding carton 19 as proposed by this invention, where the assumption has been that the base 2 of the folding carton 19 is to have a rectangular or square shape. The arrow 4 indicates the direction in which the folding carton blank 1 is moved, parallel to which the two side panels 3 with the adjacent lid flaps 5 are provided, the width of the side panels 3 at least corresponding to the height of the product that is to be packaged. The side panels 6 extending at right angles to the transport direction have closure flaps 7 adjacent to them that interact with the closure flaps 7 of the lid flaps 5 when the folding carton is formed. 12 are the overlapping edges of the lid flaps 5.

This folding carton blank 1 or folding carton blanks of a similar shape are removed from a stack of blanks and are transferred to a conveyor which operates on the basis of continuous forward movement in the process proposed by this invention.

Figure 2:
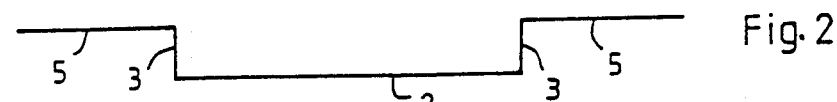
FIG. 2 is a front view of the blank once it has been pre-formed so that the folding carton can be filled.

In the course of the first stage of the process, the individual blank 1 is pre-formed into the shape shown in FIG. 2. Following this, the side panels 3 are folded into an upright position and the lid flaps 5 are then folded again at right angles to the side panels 3. This leads to the formation of a base for the folding carton with open ends, which can be filled with the fragile product during a continuous advance operation. It goes without saying that the upright side panels 3 of the folding carton blank 1 are supported on the sides by external guides while they are moved forwards.

Figure 3:
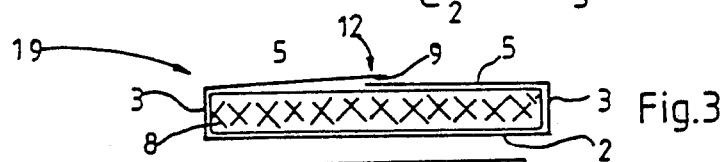
FIG. 3 is a cross-section of the folding carton after the product has been filled.

FIG. 3 is a cross-section of the filled folding carton 19, in which 8 represents the fragile product. This product 8 might perhaps be a frozen pizza, although the invention is not limited to this one product. In this example the lid flaps 5 have already been folded over and adhesive 9 has been applied to one of the lid flaps 5 in the area of the edges where they overlap 12. The use of hotmelts is preferred, as they set quickly.

Figure 4:
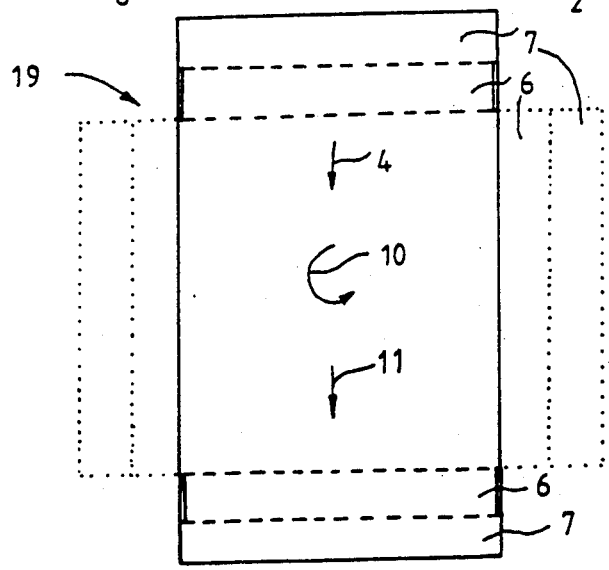
FIG. 4 is a top view of the filled folding carton shown in FIG. 3, and FIGS. 5+6 are a side and top view of a conveyor unit for turning a filled folding carton.

FIG. 4 is the top view of the filled folding carton illustrated in FIG. 3 and shows that the side panels 6 and the adjacent closure flaps 7 project beyond the ends of the folding carton 19 in transport direction 4.

The invention proposes that the filled folding carton 19 is turned through 90° around a vertical axis while it is being conveyed in transport direction 4. This is indicated by the arrow 10, the purpose of which is to show the turning movement. As a result of this turning operation, the side panels 6 and closure flaps 7 end up in the position indicated by the dots in FIG. 4, the transport direction 4,11 being maintained. While the folding carton 19 continues to be moved in the transport direction 4,11, the side panels 6 and closure flaps 7, which are now located at the sides, can be folded and coated with adhesive, after which they can be glued to the lid flaps 5.

FIGS. 5 and 6 show how the turning of the folding carton 19 can be carried out during a continuous advance operation. It has been assumed here that the folding cartons 19 filled as shown in FIGS. 3 and 4 are moved forward on a transport surface 18 by a standard conveyor that is not illustrated here.

A revolving conveyor 13, for example in the form of a chain that is guided around rollers 14, is located below this standard conveyor 18. As FIG. 6 shows, two such revolving conveyors 13 are located parallel to each other. The upper part of this conveyor 13 is moved along a fixed guide 28, so that it has a section 15 that slopes upwards, a section 16 that extends at this raised level and a section 17 that slopes downwards again.

Bars 21 are attached at right angles to the conveyors 13 at intervals corresponding to the distance between the folding cartons 19 that are moved along the transport surface 18. The conveyor 13 therefore moves forward at the same speed as the folding cartons 19. Retaining elements, consisting of a vertical bearing 22 to which a support disc 23 is attached, are provided on the bars 21. The support disc 23 on the bar 21 can be turned around a vertical axis with the help of the bearing 22. The turning movement is brought about by an arm 25, to which a sliding element 29, e.g. a roller, is attached, that engages a fixed rail 24 which is located at an angle in relation to the transport direction 4,11. While the individual support disc 23 is brought into contact with the folding carton 19 from below by being moved along the section 15 that slopes upwards, the sliding element 29 of the arm 25 enters the tapering opening 30 of the rail 24. As the sliding element 29 moves along the rail 24, the arm 25 is turned clockwise through 90° around the bearing 22. The support disc 23 and thus the folding carton 19 as well also make this turning movement, without the contents of the folding carton being touched or subjected to any strain.

FIG. 5 also shows that a further conveyor 26 or pair of conveyors 26 with the same retaining elements 27 can be located above and parallel to the conveyor 13. These retaining elements can touch the top of the folding cartons 19 from above and thus form a support which makes sure that the folding carton 19 cannot make an unplanned shift in its position on the support disc 23 when it is being turned.

| | Explanation of drawing numbers |
|---|---|
| (1) | Blank |
| (2) | Base |
| (3) | Side panel parallel to transport direction |
| (4) | Transport direction |
| (5) | Lid flap |
| (6) | Side panel |
| (7) | Closure flap |
| (8) | Fragile product |
| (9) | Adhesive |
| (10) | Turning movement |
| (11) | Transport direction |
| (12) | Overlapping edges |
| (13) | Conveyor |
| (14) | Guide rollers |
| (15) | Section sloping upwards |
| (16) | Raised section |
| (17) | Section sloping downwards |
| (18) | Transport surface |
| (19) | Folding carton |
| (20) | Retaining element |
| (21) | Bar |
| (22) | Bearing |
| (23) | Support disc |
| (24) | Rail |
| (25) | Arm |
| (26) | Conveyor |
| (27) | Retaining element |
| (28) | Guide |
| (29) | Sliding element |
| (30) | Opening for sliding element |

What is claimed:

1. Apparatus for packaging a fragile product in a folding carton having:

a rectangular base with two pairs of sides, the first pair being perpendicular to the second pair;

a first pair of side panels, one of which extends from each of the sides of the first pair of sides, a folding axis being formed between each of said first pair of side panels and the side of the base from which said side panel extends;

a second pair of side panels, one of which extends from each of the sides of the second pair of sides, a folding axis being formed between each of said second pair of side panels and the side of the base from which said side panel extends;

two lid flaps, one of which extends from each of the first pair of side panels; and two closure flaps, one of which extends from each of the second pair of side panels; the packaging apparatus comprising:

conveyor means for transporting the carton on a path in a transport direction parallel to the folding axes of the first pair of side panels to allow folding about said folding axes along said path;

carton rotating means, comprising:

pivotable retaining means connected to said conveyor means for carrying the carton; and rail means disposed below a portion of the conveyor means and extending along said portion at an angle to said transport direction so that, when said retaining means engages said rail means, said retaining means will be pivoted about a vertical axis through an angle of 90° as said retaining means traverses said portion so that said folding axes of said second pair of side panels extend parallel to the transport direction;

a first folding station for folding said carton about the axes of the first pair of side panels and a product placement station upstream of said rotating means;

a second folding station for folding said carton about the axes of the second pair of side panels downstream of said rotating means; and; said retaining means comprising a pair of disc members engaging the carton and mounting means for each disc member with one of said mounting means cooperating with said rail means for allowing rotation of each disc member about a vertical axis.

2. The invention as claimed in claim 1 wherein said portion of said conveyor means extends substantially horizontally and is preceded by an upwardly sloping section and followed by a downwardly sloping section.

3. The invention as claimed in claim 2 wherein another conveyor means is provided vertically above said first-mentioned conveyor means, said another conveyor means having pivotable retaining means for engaging the carton to retain the carton on said retainer means of said first-mentioned conveyor means.

* * * * *